(12) United States Patent
Yamamoto et al.

(10) Patent No.: US 7,176,267 B2
(45) Date of Patent: Feb. 13, 2007

(54) FLUORINE-CONTAINING POLYETHER MONOMER, AND POLYMER AND SURFACE TREATMENT AGENT COMPRISING THE SAME

(75) Inventors: Ikuo Yamamoto, Settsu (JP); Nobuo Fukita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 22 days.

(21) Appl. No.: 10/485,467

(22) PCT Filed: Jul. 26, 2002

(86) PCT No.: PCT/JP02/07584

§ 371 (c)(1),
(2), (4) Date: Feb. 2, 2004

(87) PCT Pub. No.: WO03/014171

PCT Pub. Date: Feb. 20, 2003

(65) Prior Publication Data

US 2004/0171775 A1    Sep. 2, 2004

(30) Foreign Application Priority Data

Aug. 3, 2001    (JP) .............................. 2001-236310

(51) Int. Cl.
*C08F 16/24* (2006.01)
(52) U.S. Cl. ...................... 526/247; 526/319; 560/223
(58) Field of Classification Search ................ 526/247, 526/319; 560/223
See application file for complete search history.

(56) References Cited

U.S. PATENT DOCUMENTS 4,559,179 A * 12/1985 Hisamoto et al. .............. 558/51

FOREIGN PATENT DOCUMENTS

EP          121918 A1  * 10/1984
JP          52-30489 B     8/1977
JP          53-44196 B    11/1978
JP          59-204144 A  * 11/1984
JP          60-199015 A  * 10/1985
JP          5-178980     *  7/1993
JP          5-255496     * 10/1993
JP          5-255496 A    10/1993
JP          9-104655 A     4/1997

OTHER PUBLICATIONS

International Search Report for PCT/JP02/07584 dated Oct. 15, 2002 (with english translation).*
International Search Report for PCT/JP02/07584 dated Aug. Oct. 15, 2002.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

A fluorine-containing polymer which is an active component of a surface treatment agent having excellent water- and oil-repellency is constituted by a fluorine-containing polyether monomer of the formula:

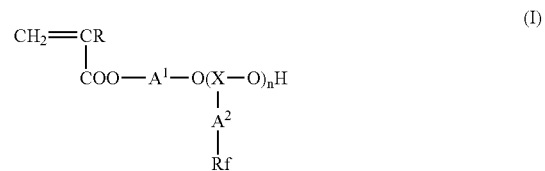

(I)

wherein Rf is a perfluoroalkyl group having 1 to 18 carbon atoms,
R is hydrogen or a methyl group,
$A^1$ is a divalent linear or branched aliphatic group having 1 to 20 carbon atoms,
$A^2$ is a direct bond, or a divalent linear or branched aliphatic group having 1 to 10 carbon atoms which may have an ether linkage,
X is a trivalent linear or branched aliphatic group having 2 to 5 carbon atoms, and n is from 1 to 100.

7 Claims, No Drawings

FLUORINE-CONTAINING POLYETHER MONOMER, AND POLYMER AND SURFACE TREATMENT AGENT COMPRISING THE SAME

FIELD OF THE INVENTION

The present invention relates to a novel fluorine-containing polyether monomer, a polymer prepared by using said monomer, and a surface treatment agent comprising said polymer as an active component.

BACKGROUND ART

Hitherto the ring-opening polymerization of an alkylene oxide (AO) is the formation of a linear polymer by ring-opening a cyclic compound having high reactivity and shown by the following scheme:

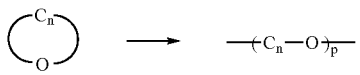

This epoxide having an oxygen heteroatom in the ring has a high polarity and becomes a reaction-active site. Most of the reactions proceed by an ionic mechanism (ionic polymerization). The ionic polymerization can be classified on the basis of the reaction mechanism into an anionic polymerization, a cationic polymerization and a coordination polymerization.

The anionic polymerization has been historically studied for very many years and has been industrially widely used for the purpose of producing a polyalkyleneglycol derivative.

The cationic polymerization is industrially used for the purpose of obtaining a polymer having a relatively low molecular weight (at most about 5,000). It is known that the cationic polymerization has a lower conversion ratio at the polymerization and easier formation of by-products than the anionic polymerization.

The coordination polymerization is called also as coordination anionic polymerization and exhibits a behavior which is intermediate between the anionic polymerization and the cationic polymerization. The coordination polymerization has one type of coordination mechanism off the anionic and cationic polymerizations and can give a polymer having a high molecular weight (molecular weight of at least 100,000). However, the coordination polymerization has the defects that the conversion ratio at the polymerization is relatively low, that the operation of catalyst is associated with danger, and that the handling is difficult.

SUMMARY OF THE INVENTION

An object of the present invention is to provide a fluorine-containing polyether monomer prepared by the ring-opening polymerization of an alkylene oxide (AO) which does not have the conventional defects associated with the ring-opening polymerization.

Another object of the present invention is to provide a polymer which is an active component of a source treatment agent imparting excellent surface properties.

The present invention provides a fluorine-containing polyether monomer of the formula:

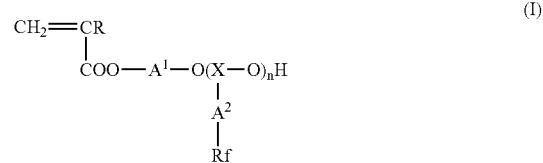

wherein Rf is a perfluoroalkyl group having 1 to 18 carbon atoms,
R is hydrogen or a methyl group,
$A^1$ is a divalent linear or branched aliphatic group having 1 to 20 carbon atoms,
$A^2$ is a direct bond, or a divalent linear or branched aliphatic group having 1 to 10 carbon. atoms which may have an ether linkage,
X is a trivalent linear or branched aliphatic group having 2 to 5 carbon atoms, and n is from 1 to 100.

Further, the present invention provides a method of producing a fluorine-containing polyether monomer, which comprises: reacting a fluorine-containing alkylene oxide of the formula:

wherein Rf is a perfluoroalkyl group having 1 to 18 carbon atoms,
$A^2$ is a direct bond, or a divalent linear or branched aliphatic group having 1 to 10 carbon atoms which may have an ether linkage, and
Y is a cyclic oxyalkylene group having 2 to 5 carbon atoms which may be optionally substituted,
with a hydroxyl group-containing (meth)acrylate of the formula:

wherein R is hydrogen or a methyl group, and
$A^1$ is a divalent linear or branched aliphatic group having 1 to 20 carbon atoms,
to give the fluorine-containing polyether monomer of the formula:

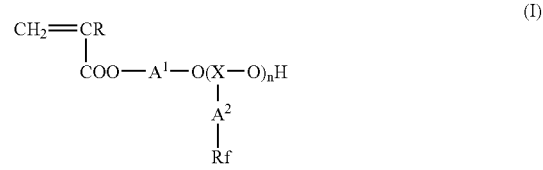

wherein Rf is a perfluoroalkyl group having 1 to 18 carbon atoms,
R is hydrogen or a methyl group,
$A^1$ is a divalent linear or branched aliphatic group having 1 to 20 carbon atoms,
$A^2$ is a direct bond, or a divalent linear or branched aliphatic group having 1 to 10 carbon atoms which may have an ether linkage,
X is a trivalent linear or branched aliphatic group having 2 to 5 carbon atoms, and n is from 1 to 100.

Additionally the present invention provides a fluorine-containing polymer having repeating units derived from said fluorine-containing polyether monomer. The fluorine-containing polymer of the present invention is a homopolymer or copolymer of the fluorine-containing polyether monomer.

The polymer of the present invention can be used as an active component of a surface treatment agent to impart water- and oil repellency to a substrate.

DETAILED DESCRIPTION OF THE INVENTION

In the fluorine-containing polyether monomer (I), Rf has an upper limit of carbon atoms which is 18, for example, 10, particularly 8.

In the fluorine-containing polyether monomer (I), n is the number of from 1 to 100, particularly from 1 to 20, for example, from 2 to 10. The number of n can be adjusted by changing a charge ratio of the hydroxyl group-containing (meth)acrylate to the fluorine-containing alkylene oxide at the reaction.

In the formula (I), $A^1$, $A^2$ and X may be an unsaturated or saturated aliphatic group, and is generally the saturated aliphatic group. Generally, $A^1$ and $A^2$ are an alkylene group. X is trivalent and generally has bond valence which is at two carbon atoms in the ends of the aliphatic group and which is at anyone of carbon atoms in the aliphatic group.

Examples of X in the formula (I) include the followings:

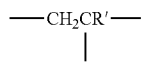 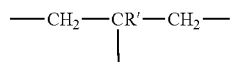

wherein R' is a hydrogen atom or a methyl group.

Preferable specific examples of X in the formula (I) include the followings:

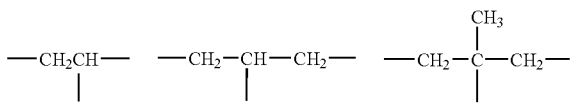

Examples of the fluorine-containing polyether monomer include the followings:

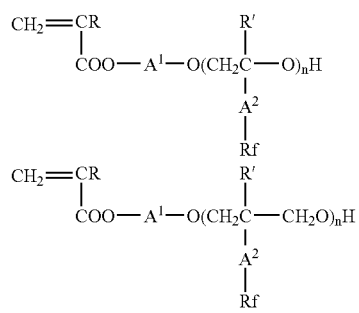

wherein Rf is a perfluoroalkyl group having 1 to 18 carbon atoms,
R is a hydrogen atom or a methyl group,
R' is a hydrogen atom or a methyl group,
$A^1$ is a divalent linear or branched aliphatic group having 1 to 20 carbon atoms, $A^2$ is a direct bond, or a divalent linear or branched aliphatic group having 1 to 10 carbon atoms which may have an ether linkage, and
n is from 1 to 100.

Preferable specific examples of the fluorine-containing polyether monomer are as follows:

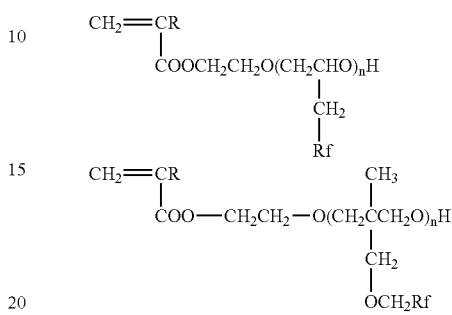

wherein Rf and R are the same as defined above.

The fluorine-containing polyether monomer of the present invention can be obtained by ring-opening a cyclic alkylene oxide group in the fluorine-containing alkylene oxide (that is, Rf epoxy).

The fluorine-containing polyether monomer of the present invention has the advantage that said fluorine-containing polyether monomer can be simply produced by the reaction between the hydroxyl group-containing (meth)acrylate (a monohydric alcohol) and the fluorine-containing alkylene oxide in a one step process. The reaction generally proceeds in an ionic polymerization. A side reaction does not occur so that a by-product such as a divinyl compound or a homopolymer of the fluorine-containing alkylene oxide is not generated. The ionic polymerization is conducted in the anionic polymerization, the cationic polymerization or the coordination polymerization.

The carbon number of $A^1$ (usually an alkylene group) in the hydroxyl group-containing (meth)acrylate (II) (a monohydric alcohol) is particularly preferably from 2 to 5. Examples of the hydroxyl group-containing (meth)acrylate (II) include 2-hydroxyethyl (meth)acrylate, 2-hydroxypropyl (meth)acrylate, 2-hydroxybutyl (meth)acrylate, 2-hydroxy-1-methylpropyl (meth)acrylate, and 2-hydroxy-2-methylpropyl (meth)acrylate.

The carbon number of Rf in the fluorine-containing alkylene oxide (III) gives effect on the difficulty of synthesis and the water- and oil-repellency of the resultant polymer. The carbon number of Rf is preferably from 2 to 18, for example, from 2 to 14, particularly from 6 to 10. Examples of Rf include $CF_3(CF_2)_p$—(p=1 to 17, for example, 1 to 6) and $(CF_3)_2CF(CF_2)_{p-(p=1}$ to 15, for example, 1 to 4).

Examples of $A^2$ include a direct bond, a methylene group, a dimethylene group, —$CH_2$—O—$CH_2$— and —CH=CH—$CH_2$—O—$CH_2$—.

Y is an oxyalkylene group which may be optionally substituted. Y is preferably an oxirane ring or an oxetane ring. Examples of the substituent group include an alkyl group having 1 to 5 carbon atoms, particularly a methyl group.

Examples of the fluorine-containing alkylene oxide (III) are as follows:

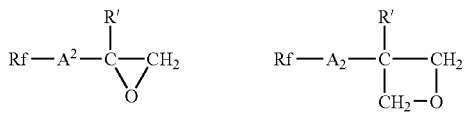

wherein R', Rf and $A^2$ are the same as defined above.

Specific examples of the fluorine-containing alkylene oxide (III) having the oxirane ring or the oxetane ring are as follows:

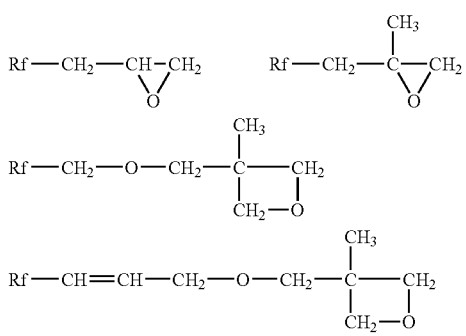

In the production of the fluorine-containing polyether monomer, the ring-opening of the alkylene oxide can be conducted by various polymerizations such as the anionic polymerization, the cationic polymerization and the coordination polymerization. The cationic polymerization is particularly preferable. A catalyst used in the cationic polymerization may be a Lewis acid catalyst such as $SnCl_2$ and $BF_3$-diethyl ether complex. Analogous reactions for hydrocarbons are reported in JP-B-52-30489, JP-B-53-44196 and JP-A-5-255496 and can be used for the present invention.

A reaction temperature for the production of the fluorine containing polyether monomer is preferably from 30° C. to 80° C., more preferably from 30° C. to 50° C. At the temperature of at most 80° C., preferably, a polymerizable group contained in the hydroxyl group-containing (meth) acrylate does not radically polymerize.

In the reaction, it is preferable to use a catalyst and/or a polymerization inhibitor. Preferable examples of the catalyst are a compound of boron (B), aluminum (Al), antimony (Sb), beryllium (Be), phosphorus (P), iron (Fe), zinc (Zn), titanium (Ti) or zirconium (Zr). Examples of the polymerization inhibitor are catechol and hydroquinone. The reaction may be conducted in a solvent or without a solvent.

The fluorine-containing polyether monomer of the present invention is a macromolecular monomer (a macromonomer) having a polymerizable group such as a vinyl group. The polymer of the fluorine-containing polyether monomer is a graft polymer and has excellent surface modification properties.

The fluorine-containing polymer constituting the surface treatment agent may comprise:
(I) a repeating unit derived from the fluorine-containing polyether monomer of the present invention,
(II) a repeating unit derived from a fluorine-free monomer,
(III) optionally present, a repeating unit derived from a crosslinkable monomer, and
(IV) optionally present, a repeating unit derived from a fluoroalkyl group-containing (meth)acrylate monomer.

The repeating units (III) and (IV) may be either present or absent. The presence of the repeating unit (III) improves the adhesion to a treated substrate. The repeating unit (IV) is caused to be present according to the necessary properties.

The fluorine-containing polyether monomer consuming the repeating unit (I) is a perfluroalkyl group-containing monomer.

The repeating unit (II) is preferably derived from a fluorine-free olefinically unsaturated monomer. Non-limiting examples of a preferable monomer constituting the repeating unit (II) include, for example, ethylene, vinyl acetate, vinyl halide such as vinyl chloride, vinylidene halide such as vinylidene chloride, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, vinyl alkyl ether and isoprene.

The fluorine-containing polymer may contain vinyl halide or vinylidene halide.

The monomer constituting the repeating unit (II) may be a (meth)acrylate ester having an alkyl group. The number of carbon atoms in the alkyl group may be from 1 to 30, for example, from 6 to 30, e.g., from 10 to 30. For example, the monomer constituting the repeating unit (II) may be arylates of the general formula:

$$CH_2=CA^3COOA^4$$

wherein $A^3$ is a hydrogen atom or a methyl group, and $A^4$ is an alkyl group represented by $C_nH_{2n+1}$ (n=1 to 30). The copolymerization with this monomer can optionally improve various properties such as water repellency and soil releasability; cleaning durability, washing durability and abrasion resistance of said repellency and releasability; solubility in solvent; hardness; and feeling.

The crosslinkable monomer constituting the repeating unit (III) may be a fluorine-free vinyl monomer having at least two reactive groups. The crosslinkable monomer may be a compound having at least two carbon-carbon double bonds, or a compound having at least one carbon-carbon double bond and at least one reactive group.

Examples of the crosslinkable monomer include diacetoneacrylamide, (meth)acrylamide, N-methylolacrylamide, hydroxymethyl (meth)acrylate, hydroxyethyl (meth)acrylate, 3chloro-2-hydroxypropyl (meth)acrylate, N,N-dimethylaminoethyl (meth)acrylate, N,N-diethylaminoethyl (meth)acrylate, butadiene, chloroprene and glycidyl (meth)acrylate, to which the crosslinkable monomer is not limited. The copolymerization with this monomer can optionally improve various properties such as water-repellency and soil releasability; cleaning durability and washing durability of said repellency and releasability; solubility in solvent; hardness; and feeling.

The fluoroalkyl group-containing (meth)acrylate monomer constituting the repeating unit (IV) may be of the formula:

$$Rf-A-OCOCR^{11}=CH_2$$

wherein Rf is a fluoroalkyl group having 3 to 21 carbon atoms,
$R^{11}$ is hydrogen or a methyl group,
A is a divalent organic group.

In the above formula, A may be a linear or branched alkylene group having 1 to 20 carbon atoms, a $-CH_2CH(OR^{21})CH_2-$ group (wherein $R^{21}$ is a hydrogen atom or an acyl group having 1 to 10 carbon atoms).

Examples of the fluoroalkyl group-containing (meth)acrylate monomer include the followings:

$$Rf—(CH_2)_nOCOCR^3=CH_2 \quad (1)$$

$$Rf—CO\overset{R^1}{N}R^2OCOCR^3=CH_2 \quad (2)$$

$$Rf—CH_2\overset{OH}{C}HCH_2OCOCR^3=CH_2 \quad (3)$$

$$Rf—CH_2\overset{OCOR^3}{C}HCH_2OCOCR^3=CH_2 \quad (4)$$

$$Rf—O—Ar—CH_2OCOCR^3=CH_2 \quad (5)$$

wherein Rf is a fluoroalkyl group having 3 to 21 carbon atoms, $R^1$ is hydrogen or an alkyl group having 1 to 10 carbon atoms, $R^2$ is an alkylene group having 1 to 10 carbon atoms, $R^3$ is hydrogen or a methyl group, Ar is an arylene group which may have a substituent group, and n is an integer of 1 to 10.

Specific examples of the fluoroalkyl group containing (meth)acrylate are as follows:

$CF_3(CF_2)_7(CH_2)_{10}OCOCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOC(CH_3)=CH_2$
$(CF_3)_2CF(CF_2)_6(CH_2)_2OCOCH=CH_2$
$(CF_3)_2CF(CF_2)_8(CH_2)_2OCOCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3CF_2(CF_2)_6(CH_2)_2OCOCH=CH_2$
$CF_3CF_2(CF_2)_8(CH_2)_2OCOCH=CH_2$
$CF_3CF_2(CF_2)_{10}(CH_2)_2OCOCH=CH_2$
$CF_3CF_2(CF_2)_6(CH_2)_2OCOC(CH_3)=CH_2$
$CF_3CF_2(CF_2)_8(CH_2)_2OCOC(CH_3)=CH_2$
$CF_3CF_2(CF_2)_{10}(CH_2)_2OCOC(CH_3)=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$

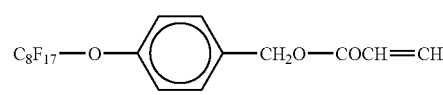

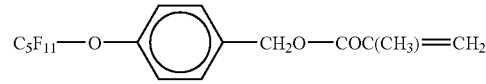

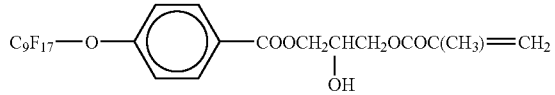

The fluorine-containing polymer preferably has a weight average molecular weight of 2,000 to 1,000,000.

Preferably, the amount of the repeating unit (I) is from 1 to 90% by weight, more preferably from 5 to 80% by weight, the amount of the repeating unit (I) is from 5 to 90% by weight, more preferably from 10 to 80% by weight, the amount of the repeating unit (III) is from 0 to 10% by weight, more preferably 0.1 to 10% by weight, for example 0.5 to 10% by weight, the amount of the repeating unit (IV) is from 0 to 90% by weight more preferably from 0.1 to 50% by weight, based on the fluorine-containing polymer.

The fluorine-containing polymer in the present invention can be produced by any polymerization method, and the conditions of the polymerization reaction can be arbitrarily selected. The method and conditions of the polymerization reaction can be arbitrarily selected and include, for example, bulk polymerization, solution polymerization, suspension polymerization and emulsion polymerization In the solution polymerization, there can be used a method of dissolving a monomer in an organic solvent in the presence of a polymerization initiator, replacing the atmosphere with nitrogen and stirring the mixture with heating at the temperature within the range from 50 to 120° C. for 1 to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator is used in the amount within the range from 0.01 to 20 parts by weight based on 100 parts by weight of the monomer.

The organic solvent is inert to the monomer and dissolves it, and examples thereof include pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane (CFC-316). The organic solvent maybe used in the amount within the range from 50 to 1,000 parts by weight based on 100 parts by weight of the monomer.

In the emulsion polymerization, there can be used a method of emulsifying a monomer in water in the presence of a polymerization initiator and an emulsifying agent, replacing by nitrogen, and copolymerizing with stirring at the temperature within the range, for example, from 50 to 80° C. for 1 to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) can be used. The polymerization initiator is used in the amount within the range from 0.01 to 5 parts by weight based on 100 parts by weight of the monomer.

In order to obtain a copolymer dispersion in water, which is superior in storage stability, it is desirable that the monomer is atomized in water by using an emulsifying device capable of applying a strong shattering energy (e.g., a high-pressure homogenizer and an ultrasonic homogenizer) and then polymerized with using the water-soluble polymerization initiator. As the emulsifying agent, various emulsifying agents such as an anionic emulsifying agent, a cationic emulsifying agent and a nonionic emulsifying agent can be used in the amount within the range from 0.5 to 10 parts by weight based on 100 parts by weight of the monomer. When the monomer is not completely compatibilized, a compatibilizing agent capable of sufficiently compatibilizing them (e.g., a water-soluble organic solvent and a low-molecular weight monomer) is preferably added to the monomer. By the addition of the compatibilizing agent, the emulsifiability and copolymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weights e.g., from 10 to 40 parts by weight, based on 100 parts by weight of water.

The fluorine-containing polymer of the present invention can be used as a surface treatment agent for treating surfaces of various articles and can modify the surfaces of articles, for example, can impart the water- and oil-repellency.

The fluorine-containing polymer of the present invention has excellent water- and oil-repellency and high molecular stability and even if the polymer is subjected to sun light, wind and rain, the polymer seldom discolors or decomposes. Thus, when the water- and oil-repellent treatment is conducted by using the fluorine-containing polymer, a treated substrate can maintain excellent water- and oil-repellency in the long term.

The water- and oil-repellent treatment can be conducted by an arbitrary method according to the form of each treatment agent. When the surface treatment agent in the form of an aqueous emulsion or a solution in a solvent is used, a liquid containing the polymer is attached to at least surface of a substrate by a dip coating and the like and is dried. In the case of the surface treatment in the form of an emulsion, after the treatment liquid is dried, it is preferable to conduct the curing for the purpose of continuing the polymer fine particles and of melt-attaching to and penetrating into the substrate. Thus, the high water- and oil-repellency effect can be exhibited. The surface treatment agent in the form of a solution has the advantage that sufficiently high water- and oil-repellency can be exhibited even if the curing or washing is not conducted, because the drying gives a polymer film formed on the substrate. If necessary, the curing may be conducted. The drying temperature is arbitrarily selected. In the case of the emulsion-type treatment agent, the substrate may be dried at room temperature and the drying at 80 to 120° C. by hot air wind is effective. In the case of the solution-type treatment agent, about 80 to 150° C. is suitable.

The substrate to be treated with the surface treatment agent of the present invention is various. Examples of the substrate include textile, glass, paper, wood, hide, fur, asbestos, brick, cement, metal and oxide, ceramics, plastic, coated surface and plaster.

The substrate to be treated in the present invention is preferably a textile, particularly a carpet. The textile has various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber, and a mixture of these fibers.

The textile may be in any form such as fiber, yarn and fabric. When the carpet is treated according to the present invention, the carpet may be formed after treating fibers or yarns with the surface treatment agent or the formed carpet may be treated with the surface treatment agent. The surface treatment agent may contain the fluorine-containing polymer in the diluted concentration of 0.02 to 30% by weight, preferably of 0.02 to 10% by weight.

EMBODIMENTS OF THE INVENTION

Preparation Examples, Polymerization Examples and Examples of the present invention are shown and the present invention is illustrated. Hereinafter, "%" is "% by weight", unless specified otherwise.

Synthesis of a monomer [$CH_2$=$C(CH_3)COOCH_2CH_2O(CH_2CH(CH_2Rf)O)_nH$] is shown in the following Preparation Examples.

PREPARATION EXAMPLE 1

2-Hydroxyethyl methacrylate [2.26 g (0.017 mol)], boron trifluoride-diethyl ether complex [0.19 g (0.0013 mol)], t-butyl catechol [0.013 g ($7.8\times10^{-5}$ mol)] were charged into a four-necked flask and stirred. Thereafter, 3-perfluorooctyl-1,2-epoxypropane [23.8 g (0.05 mol)] was dropwise added into the solution for 20 minutes. Immediately after the addition, the temperature was rapidly increased from 31° C. to 51° C. After the completion of the addition, the reaction was conducted for 1 hour (31° C. at the completion of the reaction). The reaction was conducted under the nitrogen atmosphere. After the completion of the reaction, HCF-C225 (75 g) and $H_2O$ (75 g) were added and the mixture was charged into a separable funnel. After the mixture was sufficiently mixed, an aqueous layer was neutralized with a 10% $NaHCO_3$ aqueous solution. An organic layer was removed, $H_2O$ (75 ml) was added and the same procedure as above was repeated once. Thereafter, anhydrous $MgSO_4$ (5 g) was added and the organic layer was dried over one night. The organic layer was filtered and evaporated to give an oily compound. Yield: 18.1 g.

By elemental analysis, IR and NMR, the objective compound was identified. The number (n) of the ether repeating units [—X—O— in the formula (I)] existing in the objective compound molecule was calculated as an average of n from a integral ratio in $^1$H-NMR (proton existing in the ether repeating unit/proton existing in the methacrylate moiety).

Elemental analysis: Measured C: 29.9 mass %; H: 1.79 mass %; F: 60.2 mass %; Calculated [for $C_{29.1}H_{20.5}F_{35.7}O_{5.1}$ compound (Average of n=2.1)] C: 30.9 mass %; H: 1.83 mass %; F: 60.0 mass % IR using KBr disk [v/cm$^{-1}$]: 1721.2(—COO—), 1234.1(—COC—) NMR measurement data: $^1$H-NMR [$d_6$-acetone] δ (ppm): 6.23, 5.74($CH_2$=); 4.50, 4.28 (—$COOCH_2$—); 4.15 (—CHO—), 3.88 (—$CH_2O$—); 3.76 (—$CH_2$—); 2.85 (—$Ch_2$—Rf); 2.03 (—$CH_3$) $^{19}$F-NMR [$d_6$-acetone)] δ (ppm): −80.37(—$CF_3$); −109.90, −120.42, −121.47, −122.11; −122.89, −125.46(—$CF_2$—) $^{13}$C-NMR [$d_6$-acetone] δ (ppm): 167.5 (—COO—); 137.6 (=$C(CH_3)COO$—); 125.6($CH_2$=); 120.5, 120.1, 119.6, 116.3, 115.8, 112.3, 111.9, 109.2 (—$C_8F_{17}$); 75.3–64.5 (—$CH_2CH_2O(CH_2CHO)_{2.1}H$); 35.9, 35.7, 35.4 (—$CH_2$—Rf); 18.5 (—$CH_3$)

PREPARATION EXAMPLE 2

In the same procedure as in Preparation Example 1, 2-hydroxyethyl methacrylate was reacted with 3-perfluorooctyl-1,2-epoxypropane. The same procedure as in Preion Example 1 was repeated to give a white waxy compound except that the amount of 3-perfluorooctyl-1,2-epoxypropane was changed to 47.6 g (0.1 mol). During the dropwise addition of the Rf epoxy, the temperature was rapidly increased from 28° C. to 39° C. Yield: 37.4 g.

Elemental analysis: Measured C: 28.8 mass %; H: 1.43 mass %; F: 63.5 mass %; Calculated [for $C_{56.6}H_{33}F_{78.2}O_{7.6}$ compound (Average of n=4.6)] C: 29.3 mass %; H: 1.43 mass %; F: 64.0 mass % IR using KBr disk [v/cm$^{-1}$]: 1718.5 (—COO—), 1204.7 (—COC—) NMR measurement data: $^1$H-NMR [CFC-113] δ (ppm): 6.24, 5.67 (CH$_2$=); 4.50, 4.26 (—COOCH$_2$—); 4.09 (—CHO—), 3.86 (—CH$_2$O—); 3.74 (—CH$_2$—); 2.79 (—CH$_2$—Rf); 2.05 (—CH$_3$) $^{19}$F-NMR [CFC-113] δ (ppm): −80.99 (—CF$_3$); −111.41, −120.92, −121.97, −122.58, −123.41, −126.02(—CF$_2$—) $^{13}$C-NMR [CFC-113] δ (ppm): 166.5 (—COO—); 136.4 (=C(CH$_3$)COO—); 128.0,127.6 (CH$_2$=); 120.8–106.9 (—C$_8$F$_{17}$); 73.2–62.6 (—CH$_2$CH$_2$O(CH$_2$CHO)$_{4.6}$H): 34.5, 33.4, 29.7 (—CH$_2$—Rf); 17.5 (—CH$_3$)

PREPARATION EXAMPLE 3

In the same procedure as in Preparation Example 1, 2-hydroxyethyl methacrylate was reacted with 3-perfluorooctyl-2-epoxypropane. The same procedure as in Preparation Example 1 was repeated to give a white waxy compound except that the amount of 3-perfluorooctyl-1,2-epoxypropane was changed to 95.2 g (0.2 mol). During the dropwise addition of Rf epoxy, the temperature was rapidly increased from 24° C. to 33° C. Yield: 39.8 g.

Elemental analysis: Measured C: 28.3 mass %; H: 1.37 mass %; F: 64.1 mass %; Calculated [for $C_{79.7}H_{43.5}F_{113.9}O_{9.7}$ compound (Average of n=6.7)] C: 28.3 mass %; H: 1.32 mass %; F: 65.1 mass %. IR using KBr disk [v/cm$^{-1}$]: 1718.2 (—COO—), 1204.5 (—COC—) NMR measurement data: $^1$H-NMR [CFC-113] δ (ppm): 6.58, 5.74 (CH$_2$=); 4.71, 4.27 (—COOCH$_2$—); 4.08 (—CHO—), 3.85 (—CH$_2$O—); 3.74 (—CH$_2$—); 2.78 (—CH$_2$-Rf); 2.03 (—CH$_3$) $^{19}$F-NMR [CFC-113] δ (ppm): −80.97 (—CF$_3$); −111.02, −120.84, −122.00, −122.58, −123.42, −126.00(—CF$_2$—) $^{13}$C-NMR [CFC-113] δ (ppm): 170.3 (—COO—); 140.1 (=C(CH$_3$)COO—); 127.1 (CH$_2$=); 122.2–110.0 (—C$_8$F$_{17}$); 77.4–66.5 (—CH$_2$CH$_2$O(CH$_2$CHO)$_{6.7}$H); 37.5, 37.4, 33.6 (—CH$_2$-Rf); 21.4 (—CH$_3$)

The preparations of homopolymers are shown in the following Polymerization Examples.

Polymerization Example 1

The fluoroalkyleneglycol methacrylate (FAGMA) monomer (Average of n=2.1) (21 g) prepared in Preparation Example 1 and CFC-316 (170 g) were charged into a four-necked flask and the flask was purged with nitrogen for one hour on a hot water bath at 60° C. (external temperature). t-Butyl peroxy pivalate (PERBUTYL PV manufactured by NOF Corp.) [2.25 g (0.0129 g)] dissolved in trichloroethane (11.0 g) was added and the polymerization was conducted for 5 hours. Acetone was added to the solution resulting from the polymerization, to precipitate a polymer. After a supernatant liquid was discarded, the polymer was washed with acetone and dried in a vacuum desiccator to give a white solid. Yield: 11.2 g.

Elemental analysis: Measured C: 30.9 mass %; H: 1.87 mass %; F: 59.mass %; Calculated (for $C_{29.1}H_{20.5}F_{35.7}O_{5.1}$ compound) C: 30.9 mass %; H: 1.83 mass %; F: 60.0 mass %. IR using KBr disk [v/cm$^{-1}$]: 1729.9 (—COO—), 1204.5 (—COC—) NMR measurement data: $^1$H-NMR [CFC-113] δ (ppm): 5.0–3.0 (—COOCH$_2$CH$_2$O(CH$_2$CHO)—); 2.8–1.7 (—CH$_2$-Rf,—CH$_2$—); 1.5–0.84 (—CH$_3$) $^{13}$C-NMR [CFC-113] δ (ppm): 177.6 (—COO—); 123.5–106.8(—C$_8$F$_{17}$); 73.8–64.2 (—CH$_2$CH$_2$O(CH$_2$CHO)$_{2.1}$H); 55.0 (—CH$_2$—); 45.1 (=C(CH$_3$)COO—); 34.6, 33.3 (—CH$_2$-Rf); 17.2 (—CH$_3$)

Polymerization Example 2

The FAGMA monomer (Average of n=4.6) (21 g) prepared in Preparation Example 2 and CFC-316 (170 g) were charged into a four-necked flask and the flask was purged with nitrogen for one hour on a hot water bath at 60° C. (external temperature). PERBUTYL PV (2.25 g) dissolved in trichloroethane (11.0 g) was added and the polymerization was conducted for 5 hours. The stirring was conducted by a mechanical stirrer. Acetone was added to the solution resulting from the polymerization, to precipitate a polymer. After a supernatant liquid was discarded, the polymer was washed with acetone and dried in a vacuum desiccator. After the solid was dissolved in tetrahydrofuran (THF), the solution was filtered and evaporated and dried again in the vacuum desiccator to give a white solid. Yield: 19.5 g.

Elemental analysis: Measured C: 29.0 mass %; H: 1.56 mass %; F: 62.2 mass %; Calculated (for $C_{56.6}H_{33.0}F_{78.2}O_{7.6}$ compound) C: 29.3 mass %; H: 1.43 mass %; F: 64.0 mass %. IR using KBr disk [v/cm$^{-1}$]: 1733.1 (—COO—), 1203.7 (—COC—) NMR measurement data: $^1$H-NMR [CFC-113] δ (ppm): 4.6–3.0(—COOCH$_2$CH$_2$O(CH$_2$CHO)—); 2.8–1.7 (—CH$_2$-Rf,—CH$_2$—); 1.5–0.70 (—CH$_3$) $^{13}$C-NMR [CFC-113] δ (ppm): 177.6(—COO—); 123.5–106.8 (—C$_8$F$_{17}$); 73.8–64.2 (—CH$_2$CH$_2$O(CH$_2$CHO)$_{2.1}$H); 55.0 (—CH$_2$—); 45.1 (=C(CH$_3$)COO—); 34.6, 33.3 (—CH$_2$-Rf); 17.2 (—CH$_3$)

Polymerization Example 3

The FAGMA monomer (Average of n=6.7) (10.5 g) prepared in Preparation Example 3 and CFC-316 (85 g) were charged into a four-necked flask and the flask was purged with nitrogen for one hour on a hot water bath at 60° C. (external temperature). PERBUTYL PV (1.12 g) dissolved in trichloroethane (5.5 g) was added and the polymerization was conducted for 5 hours. The stirring was conducted by a mechanical stirrer. Acetone was added to the solution resulting from the polymerization, to precipitate a polymer. After a supernatant liquid was discarded, the polymer was washed with acetone and dried in a vacuum desiccator. After the solid was dissolved in THF, the solution was filtered and evaporated and dried again in the vacuum desiccator to give a white solid. Yield: 8.7 g.

Elemental analysis: Measured C: 27.7 mass %; H: 1.36 mass %; F: 63.7 mass %; Calculated (for $C_{79.7}H_{43.5}F_{113.9}O_{9.7}$ compound) C: 28.8 mass %; H: 1.32 mass %; F: 65.2 mass % IR using KBr disk [v/cm$^{-1}$]: 1734.1 (—COO—), 1203.7 (—COC—) NMR measurement data: $^1$H-NMR [CFC-113] δ (ppm): 4.5–3.0 (—COOCH$_2$CH$_2$O(CH$_2$CHO)—); 2.7–1.8 (—CH$_2$-Rf,—CH$_2$—); 1.50–0.70 (—CH$_3$) $^{13}$C-NMR [CFC-113] δ (ppm): 175 (—COO—); 121.0–107.8 (—C$_8$F$_{17}$); 74.2–65.4 (—CH$_2$CH$_2$H(CH$_2$CHO)$_{2.1}$H); 54.0 (—CH$_2$—); 45.0 (=C(CH$_3$)COO—); 35.5, 34.4, 29.8 (—CH$_2$-Rf); 17.5 (—CH$_3$)

The preparations of the copolymers are shown in the following Polymerization Examples.

Polymerization Example 4

The FAGMA monomer (Average of n=2.1) (10.5 g) prepared in Preparation Example 1, stearyl acrylate (StA: CH$_2$=CHCOOC$_{18}$H$_{37}$) (9 g) and CFC-316 (170 g) were charged into a four-necked flask and the flask was purged with nitrogen for one hour on a hot water bath at 60° C. (external temperature). PERBUTYL PV (2.25 g) dissolved in trichloroeloane (11.0 g) was added and the polymerization was conducted for 5 hours. The stirring was conducted by a mechanical stirrer. Acetone was added to the solution resulting from the polymerization, to precipitate a polymer. After a supernatant liquid was discarded, the polymer was washed with acetone and dried in a vacuum desiccator to give a white solid. Yield: 25.90 g.

Elemental analysis: Measured C: 46.4 mass %; H: 5.11 mass %; F: 39.4 mass %; Calculated [for $C_{24.6}H_{34.0}F_{13.2}O_{3.1}$ compound (FAGMA/StA=37/63 mol %)] C: 46.8 mass %; H: 5.43 mass %; F: 39.7 mass %. IR using KBr disk [v/cm$^{-1}$]: 1733.9 (—COO—), 1206.9 (—COC—) NMR measurement data: $^1$H-NMR [CFC-113] δ (ppm): 4.5–3.4 (FAGMA: —COOCH$_2$CH$_2$O(CH$_2$CHO)—; StA:—COOCH$_2$—); 2.7–2.1 FAGMA: —CH$_2$-Rf, StA: 1.9–0.7 —CH$_2$—CHCOO—); 1.5–0.70 (FAGMA: —CH$_3$; StA: —CH$_2$—C(CH$_3$)—; StA: —COOCH$_2$(CH$_2$)$_{16}$CH$_3$) $^{13}$C-NMR [CFC-113] δ (ppm): 175.2 (FAGMA —COO—; StA: —COO—); 121.0–113.7 (—C$_8$F$_{17}$); 74.0–65.5 (FAGMA: —Ch$_2$CH$_2$O(CH$_2$CHO)$_{2.1}$H; StA: —COOCH$_2$(CH$_2$)$_{16-l}$); 54.0 (FAGMA: —Ch$_2$—CH(CH$_3$)—); 46.3 (FAGMA: —C(CH$_3$)COO—); 42.4 (CH$_2$=CHCOO—); 36.0–32.1 (FAGMA: —Ch$_2$—C(CH$_3$)COO—; StA:—(Ch$_2$—CHCOO—); 30.8–23.5 (FAGMA: —CH$_2$—Rf, StA: —Ch$_2$)$_{16}$—CH$_2$—CH$_3$); 20.0 (FAGMA: —Ch$_2$—C(CH$_3$)—); 14.4 (StA: —(CH$_2$)$_{16}$—CH$_3$)

Polymerization Example 5

The FAGMA monomer (Average of n=4.6) (21 g) prepared in Preparation Example 2, StA (9 g) and CFC-316 (170 g) were charged into a four-necked flask and the flask was purged with nitrogen for one hour on a hot water bath at 60° C. (external temperature). PERBUTYL PV (2.25 g) dissolved in trichloroethane (11.0 g) was added and the polymerization was conducted for 5 hours. The stirring was conducted by a mechanical stirrer. Acetone was added to the solution resulting from the polymerization, to precipitate a polymer. After a supernatant liquid was discarded, the polymer was washed with acetone and dried in a vacuum desiccator. After the solid was dissolved in tetrahydrofuran (THF), the solution was filtered and evaporated and dried again in the vacuum desiccator to give a white solid. Yield: 28.37 g.

Elemental analysis: Measured C: 41.8 mass %; H: 4.11 mass %; F: 42.6 mass %; Calculated $[C_{31.0}H_{39.7}F_{20.3}O_{3.5}$ compound(FAGMA/StA=26/74 mol %)] C: 43.6 mass %; H: 4.68 mass %; F: 45.2 mass % IR using KBr disk [v/cm$^{-1}$]: 1734.8 (—COO—), 1205.9 (—COC—) NMR measurement data: $^1$H-NMR [CFC-113] δ (ppm): 4.5–3.4 (FAGMA:—COOCH$_2$CH$_2$O(CH$_2$CHO)—; StA:—COOCH$_2$—); 2.7–2.1 (FAGMA: —CH$_2$Rf: StA: 1.9–0.7 —Ch$_2$—CHCOO—); 1.5–0.70(FAGMA:—Ch$_3$; StA: —Ch$_2$—C(CH$_3$); StA: —COOCH$_2$(CH$_2$)$_{16}$CH$_3$) $^{13}$C-NMR [CFC-113] δ (ppm): 175.2 (FAGMA: —COO—; StA: —COO—); 121.0–113.7 (—C$_8$F$_{17}$); 74.0–65.5 (FAGMA: —Ch$_2$CH$_2$O(CH$_2$CHO)$_{2.1}$H; StA: —COOCH$_2$(CH$_2$)$_{16}$—); 54.0 (FAGMA: —CH$_2$—CH(CH$_3$)—); 46.3 (FAGMA: —C(CH$_3$)COO—); 42.4 (CH$_2$=CHCOO—); 36.0–32.1 (FAGMA: —CH$_2$—C(CH$_3$)COO—; StA: —Ch$_2$—CHCOO—); 30.8–23.5 (FAGMA: —CH$_2$-Rf; StA: —(CH$_2$)$_{16}$—CH$_2$—CH$_3$); 20.0 (FAGMA: —CH$_2$—C(CH$_3$)—); 14.4 (StA: —(CH$_2$)$_{16}$—CH$_3$)

Polymerization Example 6

The FAGMA monomer (Average of n=6.7) (21 g) prepared in Preparation Example 3, StA (9 g) and CFC-316 (170 g) were charged into a four-necked flask and the flask was purged with nitrogen for one hour on a hot water bath at 60° C. (external temperature). PERBUTYL PV (2.25 g) dissolved in trichloroethane (11.0 g) was added and the polymerization was conducted for 5 hours. The stirring was conducted by a mechanical stirrer. Acetone was added to the solution resulting from the polymerization, to precipitate a polymer. After a supernatant liquid was discarded, the polymer was washed with acetone and dried in a vacuum desiccator. After the solid was dissolved in THF, the solution was filtered and evaporated and dried again in the vacuum desiccator to give a white solid. Yield: 28.69 g.

Elemental analysis: Measured C: 42.2 mass %; H: 4.23 mass %; F: 44.0 mass %; Calculated [for $C_{33.0}H_{47.3}F_{21.6}O_{3.5}$ compound, FAGMA/StA=19/81 mol %] C: 43.7 mass %; H: 4.70 mass %; F: 45.4 mass % IR using KBr disk [v/cm$^{-1}$]: 1735.3 (—COO—), 1204.9 (—COC—) NMR measurement data:

$^1$H-NMR [CFC-113] δ (ppm): 4.5–3.4 (FAGMA: —COOCH$_2$CH$_2$O(CH$_2$CHO)—; StA: —COOCH$_2$—); 2.7–2.1 (FAGMA: —CH$_2$—Rf, StA: 1.9–0.7 —CH$_2$—CHCOO—); 1.5–0.70 (FAGMA: —CH$_3$; StA:—CH$_2$—C(CH$_3$)—; StA: —COOCH$_2$(CH$_2$)$_{16}$CH$_3$) $^{13}$C-NMR [CFC-113] δ (ppm): 175.2 (FAGMA: —COO—;StA: —COO—); 121.0–113.7 (—C$_8$F$_{17}$); 74.0–65.5 (FAGMA: —Ch$_2$CH$_2$O (CH$_2$CHO)$_{2.1}$H; StA: —COOCH$_2$(CH$_2$)$_{16-}$); 54.0 (FAGMA: —CH$_2$—CH(CH$_3$)—; 46.3FAGMA: —C(CH$_3$)COO—); 42.4 (CH$_2$=CHCOO—); 36.0–32.1 (FAGMA: —CH$_2$—C(CH$_3$)COO—; StA: —Ch$_2$—CHCOO—); 30.8–23.5 (FAGMA: —CH$_2$-Rf; StA: —CH$_2$)$_{16}$—CH$_2$—CH$_3$); 20.0 (FAGMA: CH$_2$—C(CH$_3$)—); 14.4 (StA: —CH$_2$)$_{16}$—CH$_3$)

Comparative Polymerization Example 1

A fluoroalkyl acrylate monomer (SFA-CH$_2$=CHCOOCH$_2$CH$_2$C$_8$F$_{17}$: FLUOWET AC800 manufactured by Clariant (20 g)) and CFC-316 (170 g) were charged into a four-necked flask, and the flask was purged with nitrogen for one hour on a hot water bath at 60° C. (external bath). Thereafter, t-butyl peroxy pivalate (PERBUTYL PV manufactured by NFO Corp.) (1.0 g) dissolved in 1,1,1-trichloroethane (5.0 g) was added to conduct the polymerization for 5 hours. The solution resulting from the polymerization was added to ethanol, and the polymer was purification with reprecipitation A white waxy solid was obtained.

Comparative Polymerization Example 2

The fluoroalkyl acrylate monomer (21 g) and 1,1,1-trichloroethane (170 g) and stearyl acrylate (StA: CH$_2$=CHCOOC$_{18}$H$_{37}$) (9 g) were charged into a four-necked flask, and the flask was purged with nitrogen for 30 minutes on a hot water bath at 60° C. (external bath). Thereafter, PERBUTYL PV (0.61 g) was added to conduct the polymerization for 7.5 hours. The solution resulting from the polymerization was added into methanol, and the polymer was purification with reprecipitation. A white waxy solid was obtained.

Examples and Comparative Examples are shown hereinafter. Tests for shower water repellency, water repellency and oil repellency were conducted on the polymers resulting from Polymerization Examples and Comparative Polymerization Examples. Methods of testing the shower water repellency, the water repellency and the oil repellency are as follows:

1. Shower Water Repellency Test (JIS-L-1092)

A glass funnel which has a volume of at least 250 ml and a spray nozzle which can spray 250 ml of water for 20-30 seconds are used. A test piece flame is a metal flame having a diameter of 15 cm. Three sheets of a test piece having a size of about 20 cm×20 cm are prepared and the sheet is mounted on a test piece holding flame so that the sheet has no wrinkle. The center of the spray was located on the center of the sheet. Room temperature water (250 mL) is charged into the glass funnel and sprayed on the test piece sheet (for time of 25–30 seconds). The holding flame is removed from a stand, one edge of the holding flame is grasped so that a front surface is downside and the other edge is lightly hit with a stiff substance. The holding flame is further rotated 180° and the same procedure is repeated to drop excess water droplets. The wet test piece is compared with a wet comparison standard to grade 0, 50, 70, 80, 90 and 100 points in order of poor water-repellency to excellent water repellency. The results are obtained from an average of thee measurements.

2. Water-Repellency Test (According to AATCC Test Method 118-1992)

A fabric treated with a surface treatment agent is stored in a thermo-hygrostat having a temperature of 21° C. and a humidity of 65% for at least 4 hours. A test liquid (isopropyl alcohol (IPA), water, and a mixture thereof, as shown in Table 1) which has been also stored at 21° C. is used. The test is conducted in an air-conditioned room having a temperature of 21° C. and humidity of 65%. Droplets of the test liquid in an amount of 50 μL (5 droplets) are softly dropped by a micropipette on the fabric. If 4 or 5 droplets remain on the fabric after standing for 10 seconds, the test liquid passes the test. The water-repellency is expressed by a point corresponding to a maximum content of isopropyl alcohol (% by volume) in the test liquid which passes the test. The water-repellency is evaluated as twelve levels which are Fail, 0, 1, 2, 3, 4, 5, 6, 7, 8, 9 and 10 order of a bad level to an excellent level.

TABLE 1

| | Water-repellency test liquid | |
|---|---|---|
| | (% by volume) | |
| Point | Isopropyl alcohol | Water |
| 10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

3. Oil-Repellency Test (According to AATCC Test Method 118-1992)

A fabric treated with a water- and oil-repellent agent is stored in a thermo-hygrostat having a temperature of 21° C. and a humidity of 65% for at least 4 hours. A test liquid (shown in Table 2) which has been also stored at 21° C. is used. The test is conducted in an air-conditioned room having a temperature of 21° C. and a humidity of 65%. Droplets of the test liquid in an amount of 30 μL (5 droplets) are softly dropped by a micropipette on the fabric. If 4 or 5 droplets remain on the fabric after standing for 30 seconds, the test liquid passes the test. The oil-repellency is expressed by a maximum point of the test liquid which passes the test. The oil-repellency is evaluated as nine levels which are Fail, 1, 2, 3, 4, 5, 6, 7 and 8 in order of a bad level to an excellent level.

TABLE 2

| | Oil-repellency test liquid | |
|---|---|---|
| Point | Test liquid | Surface tension (dyne/cm, 25° C.) |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| Fail | Inferior to 1 | — |

EXAMPLE 1

The polymer obtained in Polymerization Example 1 was dissolved in HCF-C225 to give a 0.5 or 1.0 mass % solution. A fabric (30×30 cm) was immersed in this polymer solution (that is, a surface treatment agent), and the liquid was removed from the fabric (500 rpm×0.3 min). Nylon (taffeta), PET (tropical), polyester/cotton mixture (PET/C (broad)), cotton (broad) were used as the fabric. The drying was conducted by drying the fabric in air over one night and then heating the fabric at 80° C. for 3 minutes. The test results are shown in Table 3.

EXAMPLE 2

The fabric was treated in the same manner as in Example 1 except that the polymer obtained in Polymerization Example 2 dissolved in HCF-C225 was used. The used fabrics were the same as in Example 1. The test results are shown in Table 3.

EXAMPLE 3

The fabric was treated in the same manner as in Example 1 except that the polymer obtained in Polymerization Example 3 dissolved in HCF-C225 was used. The test results are shown in Table 3.

EXAMPLE 4

The fabric was treated in the same manner as in Example 1 except that the polymer obtained in Polymerization Example 4 dissolved in HCF-C225 was used. The test results are shown in Table 3.

EXAMPLE 5

The fabric was treated in the same manner as in Example 1 except that the polymer obtained in Polymerization Example 5 dissolved in HCF-C225 was used. The test results are shown in Table 3.

EXAMPLE 6

The fabric was treated in the same manner as in Example 1 except that the polymer obtained in Polymerization Example 6 dissolved in HCF-C225 was used. The test results are shown in Table 3.

COMPARATIVE EXAMPLE 1

The fabric was treated in the same manner as in Example 1 except that the polymer obtained in Comparative Polymerization Example 1 dissolved in HCF-C225 was used. The test results are shown in Table 3.

COMPARATIVE EXAMPLE 2

The fabric was treated in the same manner as in Example 1 except that the polymer obtained in Comparative Polymerization Example 2 dissolved in HCF-C225 was used. The test results are shown in Table 3.

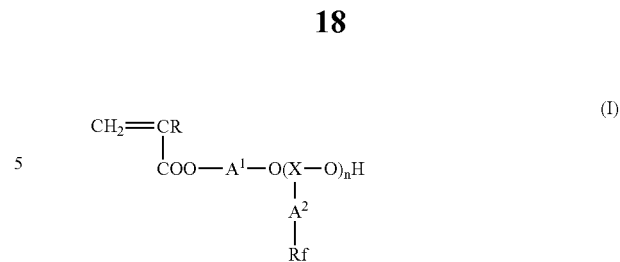

wherein Rf is a perfluoroalkyl group having 1 to 18 carbon atoms,

R is hydrogen or a methyl group, $A^1$ is a divalent linear aliphatic group having 1 to 20 carbon atoms, $A^2$ is a direct bond, or a divalent linear or branched aliphatic group having 1 to 10 carbon atoms which may have an ether linkage, X is a trivalent linear or branched aliphatic group having 2 to 5 carbon atoms, and n is from 2 to 100.

2. A fluorine-containing polymer having repeating units derived from the fluorine-containing polyether monomer according to claim 1.

3. A fluorine-containing polymer having repeating units derived from the fluorine-containing polyether monomer according to claim 1 and a comonomer.

TABLE 3

Test results (heat treatment: 80° C. × 3 min.)

| | | Nylon | | | PET | | | PET/C | | | Cotton | | |
|---|---|---|---|---|---|---|---|---|---|---|---|---|---|
| | Treatment liquid conc. | Shower Water-repellency | Water-repellency | Oil-repellency | Shower Water-repellency | Water-repellency | Oil-repellency | Shower Water-repellency | Water-repellency | Oil-repellency | Shower Water-repellency | Water-repellency | Oil-repellency |
| Com. Ex. 1 | 0.5 wt % | 70 | Fail | 4 | 90 | 7 | 4 | 0 | 0 | 4 | 0 | 1 | 5 |
| Ex. 1 | 1.0 wt % | 80 | 1 | 5 | 100 | 8 | 5 | 50 | 3 | 5 | 50 | 1 | 5 |
| | 0.5 wt % | 70 | 1 | 4 | 80 | 5 | 4 | 50 | 2 | 3 | 50 | 4 | 5 |
| | 1.0 wt % | 70 | 1 | 5 | 80 | 6 | 6 | 50 | 5 | 6 | 50 | 5 | 6 |
| Ex. 2 | 0.5 wt % | 70 | 3 | 6 | 90 | 5 | 5 | 50 | 4 | 5 | 0 | 3 | 4 |
| | 1.0 wt % | 70 | 9 | 6 | 100 | 5 | 6 | 50 | 6 | 6 | 50 | 6 | 5 |
| Ex. 3 | 0.5 wt % | 70 | 8 | 5 | 100 | 7 | 5 | 50 | 3 | 4 | 0 | 1 | 5 |
| | 1.0 wt % | 80 | 8 | 6 | 100 | 8 | 6 | 50 | 4 | 6 | 50 | 3 | 6 |
| Com. Ex. 2 | 0.5 wt % | 90 | 8 | 4 | 100 | 7 | 2 | 50 | 3 | 1 | 0 | 1 | 2 |
| | 1.0 wt % | 80 | 9 | 5 | 100 | 7 | 4 | 50 | 5 | 3 | 50 | 4 | 3 |
| Ex. 4 | 0.5 wt % | 80 | 4 | 4 | 80 | 8 | 4 | 50 | 7 | 4 | 50 | 9 | 3 |
| | 1.0 wt % | 90 | 3 | 4 | 80 | 8 | 4 | 50 | 5 | 5 | 50 | 10 | 5 |
| Ex. 5 | 0.5 wt % | 90 | 5 | 4 | 90 | 6 | 2 | 50 | 6 | 3 | 50 | 7 | 3 |
| | 1.0 wt % | 100 | 8 | 4 | 100 | 8 | 3 | 50 | 7 | 4 | 50 | 8 | 4 |
| Ex. 6 | 0.5 wt % | 100 | 5 | 4 | 100 | 8 | 5 | 50 | 5 | 3 | 50 | 7 | 2 |
| | 1.0 wt % | 100 | 8 | 6 | 100 | 9 | 5 | 50 | 8 | 5 | 50 | 7 | 4 |

EFFECTS OF THE INVENTION

The present invention provides the surface treatment agent having excellent water- and oil repellency. The fluorine-containing polyether monomer constituting the fluorine-containing polymer which is the active component of the surface treatment agent is a novel compound and can be produced in a good yield in a simple manner.

The invention claimed is:

1. A fluorine-containing polyether monomer of the formula:

4. The fluorine-containing polymer according to claim 2, which comprises:

(I) a repeating unit derived from the fluorine-containing polyether monomer according to claim 1, (II) a repeating unit derived from a fluorine-free monomer, (III) optionally present, a repeating unit derived from a crosslinkable monomer, and (IV) optionally present, a repeating unit derived from a fluoroalkyl group-containing (meth)acrylate monomer.

5. A surface treatment agent comprising, as an active component, the fluorine-containing polymer according to claim 2.

6. A surface treatment agent comprising, as an active component, the fluorine-containing polymer according to claim 3.

7. A surface treatment agent comprising, as an active component, the fluorine-containing polymer according to claim 4.

* * * * *